(12) United States Patent
Siraky

(10) Patent No.: US 7,908,762 B2
(45) Date of Patent: Mar. 22, 2011

(54) DEVICE FOR MEASURING THE RELATIVE POSITION OF A MATERIAL MEASURE AND A READING HEAD

(75) Inventor: Josef Siraky, Donaueschingen (DE)

(73) Assignee: Sick Stegmann GmbH, Donaueschingen (DE)

(*) Notice: Subject to any disclaimer, the term of this patent is extended or adjusted under 35 U.S.C. 154(b) by 0 days.

(21) Appl. No.: 12/461,497

(22) Filed: Aug. 13, 2009

(65) Prior Publication Data
US 2010/0050455 A1 Mar. 4, 2010

(30) Foreign Application Priority Data
Aug. 27, 2008 (EP) .................................... 08015103

(51) Int. Cl.
*G01B 7/02* (2006.01)
(52) U.S. Cl. ........................................................ 33/708
(58) Field of Classification Search .................... 33/708, 33/1 N, 1 PT, 706, 707
See application file for complete search history.

(56) References Cited

U.S. PATENT DOCUMENTS

| 4,484,391 A * | 11/1984 | Narimatsu ....................... 33/708 |
| 5,332,895 A * | 7/1994 | Rieder et al. ............... 250/231.14 |
| 6,912,797 B2 * | 7/2005 | Rodi .............................. 33/707 |
| 6,922,907 B2 * | 8/2005 | Rodi .............................. 33/707 |
| 7,200,515 B2 * | 4/2007 | Sakabe et al. ................. 702/151 |
| 2003/0177649 A1 * | 9/2003 | Ito et al. ........................ 33/1 PT |
| 2006/0059698 A1 * | 3/2006 | Staudt et al. .................. 33/1 PT |
| 2007/0074416 A1 * | 4/2007 | Reusing .......................... 33/706 |
| 2007/0256313 A1 * | 11/2007 | McAdam ........................ 33/706 |
| 2009/0271998 A1 * | 11/2009 | Carlen et al. ................... 33/706 |

FOREIGN PATENT DOCUMENTS

DE 10 2005 047 009 A1 4/2007
DE 10 2006 017 865 A1 10/2007

* cited by examiner

*Primary Examiner* — Christopher W Fulton
(74) *Attorney, Agent, or Firm* — The Nath Law Group; Jerald L. Meyer; Sungyeop Chung

(57) ABSTRACT

A device for measuring the relative position of a material measure (10) and a reading head (12) is described, in which the material measure (10) has an incremental scale (14); in which the incremental scale (14) is non-magnetically scanned at a high resolution by a scanner (16) belonging to the reading head (12); in which the material measure (10) has permanent magnets (18), which are positioned at equidistant intervals in the direction of measurement and which establish continuous and adjoining segments (20) within the incremental scale (14); in which the magnetic field created by the permanent magnets (18) following each other in succession is recorded by at least one magnetic sensor (24) belonging to the reading head (12); in which the magnitude of the recorded magnetic field (22) is used to assign the position of the reading head (12) to a step of the incremental scale (14) within the segment (20) defined by these permanent magnets (18); and in which a Wiegand wire device (26, 28) belonging to the reading head (10) produces segment-counting pulses upon traversing the permanent magnets (18) and these pulses are counted and permanently stored in the storage component.

9 Claims, 2 Drawing Sheets

Figure 1:
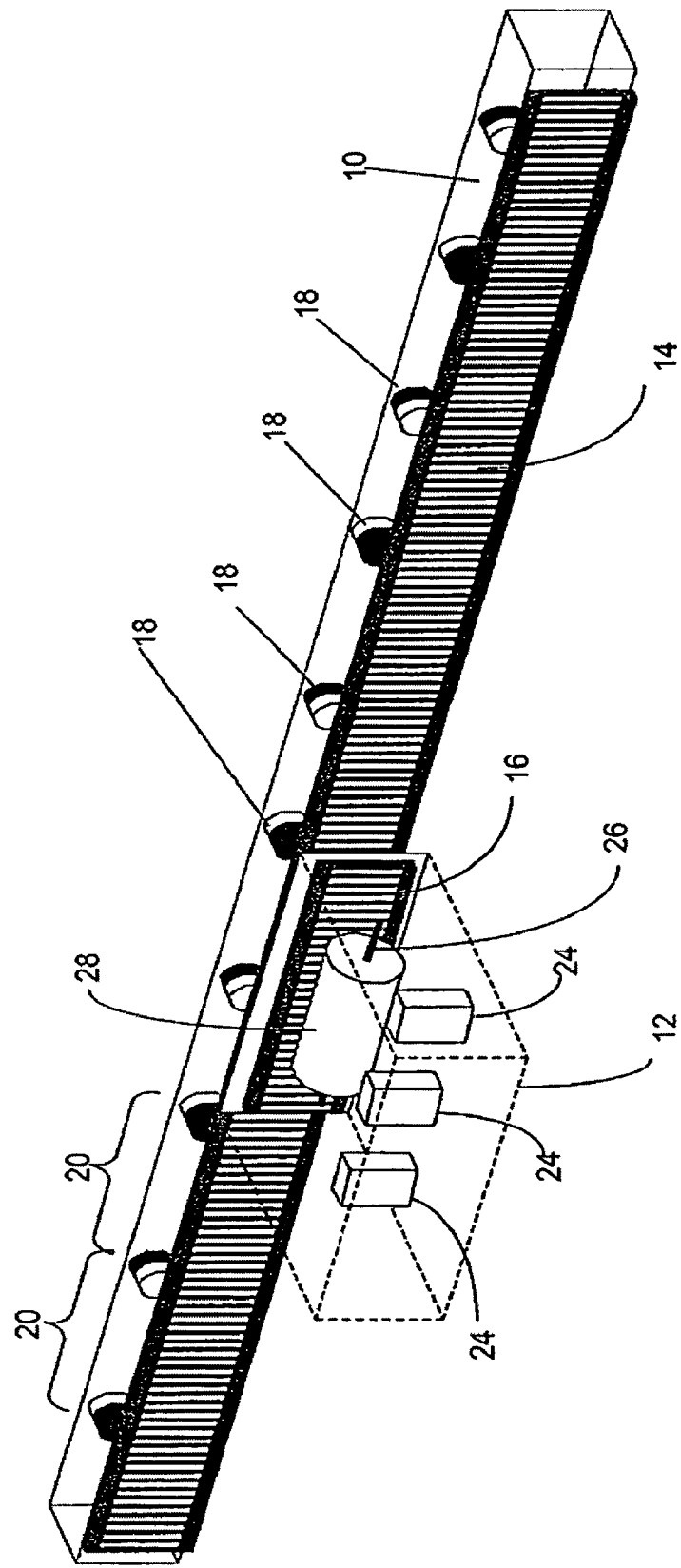

DEVICE FOR MEASURING THE RELATIVE POSITION OF A MATERIAL MEASURE AND A READING HEAD

The invention relates to a device for measuring the relative position of a material embodiment and a reading head.

In measuring the relative position of two objects that move in linear or rotational fashion relative to each other, it is known to assign a material measure to one of the objects, such that this material measure is read by a reading head assigned to the second object. In incremental systems the material measure is incrementally divided with equidistant markings, which are counted by the reading head during the course of the relative movement. In absolute systems the material measure has a coding which is read by the reading head and which indicates the given position. In the incremental systems, the counting process requires an initial position to be given in advance, while in absolute systems the position can be read immediately by means of the coding when the device is turned on.

Incremental systems have an advantage in that the material measure can be produced with relative ease, even when a high resolution is desired. The resolution can be further improved by interpolating the sinusoidal signals that generally arise during scanning of the periodic register or scale, with the result that the resolution can be improved by up to 2 or 3 orders of magnitude.

To remove the disadvantage imposed on incremental systems by the missing absolute positions, it known from DE 10 2005 047 009 A1 to position permanent magnets between the successive markings that run in the reading direction on the incremental register or scale. These permanent magnets are polarized at a right angle to the measuring direction. With an opposing arrangement of the north and south poles of the permanent magnets it is possible to produce 1-bit binary information. A plurality of successive magnets running in the reading direction thus allows the absolute position to be coded as a multi-bit word. This absolute coding process makes the material measure expensive to produce and works against an incremental scale having a high degree of resolution.

In absolute systems the measuring range is restricted, particularly in the case of linear measuring systems. The greater the measuring interval or distance, the more code tracks are required in order to code the absolute position with a sufficient resolution. This disadvantage is counteracted in DE 10 2006 017 865 A1 by dividing the material measure into individual segments in the measuring direction, i.e., by dividing it completely into successive sub-segments. Each segment is absolutely coded in concordant fashion. Since the absolute coding is restricted to the length of the segments, a sufficient resolution is obtained with a few bits. Assigned to the individual segments are permanent magnetic markings, which are recorded by the reading head during the course of relative motion and which create counting signals or pulses, and these counting pulses are incrementally counted upwards or downwards, depending on the direction of motion. The counter reading is thus assigned to the segment associated with the current position. The counter reading is permanently stored, so that the absolute position remains available even after an interruption in operation. Batteries may be used to make the storage component independent of external energy sources. DE 10 2006 017 865 A1 also specifies that the reading head has a Wiegand wire device, which both records the permanent-magnetic markings and feeds the counter circuit with its pulse energy.

The goal of the invention is to specify a device which measures the relative position and provides a high degree of resolution in a cost-effective manner, while imposing practically no restrictions on the measuring section.

The present subject matter achieves this goal with a device for measuring the relative position of a material measure and a reading head, in which the material measure has an incremental scale; in which the incremental scale is non-magnetically scanned at a high resolution by a scanner belonging to the reading head; in which the material measure has permanent magnets, which are positioned at equidistant intervals in the direction of measurement and which establish continuous and adjoining segments within the incremental scale; in which the magnetic field created by the permanent magnets following each other in succession is recorded by at least one magnetic sensor belonging to the reading head; in which the magnitude of the recorded magnetic field is used to assign the position of the reading head to a step of the incremental scale within the segment defined by these permanent magnets; and in which a Wiegand wire device belonging to the reading head produces segment-counting pulses upon traversing the permanent magnets and these pulses are counted and permanently stored in the storage component.

In accordance with an aspect of the present subject matter, in the device, the incremental scale is scanned in an optical, capacitive, or inductive manner.

According to further aspect of the present subject matter, in the device, the magnetic sensors are magneto-resistive sensors.

According to further aspect of the present subject matter, in the device, the storage component counts the segment-counting pulses upwards or downward depending on the direction of relative motion.

According to further aspect of the present subject matter, in the device, the counting circuit and the storage component are independent of external energy sources.

According to further aspect of the present subject matter, in the device, the counting circuit and the storage component are fed by a battery.

According to further aspect of the present subject matter, in the device, the counting circuit and the storage component are fed by the energy of the segment-counting pulses.

According to further aspect of the present subject matter, in the device, the device, the permanent magnets succeed each other with an alternating polarity.

According to further aspect of the present subject matter, in the device, the distance in the measuring direction between the permanent magnets is at least equal to the length in the measuring direction of the reading head.

The device according to the invention for measuring the relative position of a material measure and a reading head has a material measure and a reading head. The material measure is firmly attached to an object, while the reading head is firmly attached to a second object, which moves relative to the first object. The relative movement may be linear or rotational. The material measure will accordingly have a linear or circular design.

The material measure has an incremental scale, which may be designed in a known manner. The reading head has a scanner that corresponds to the incremental scale and can also be designed in a known manner. In the relative motion between the material measure and the reading head, scanning of the incremental scale creates signals that, as a rule, are roughly sinusoidal in shape, and this makes it possible to again interpolate the steps of the incremental scale, in an electronic evaluating unit positioned downstream. The incremental scale may be one that is optically scanned and that provides a particularly high resolution, but is mechanically sensitive. Or the incremental scale may involve a capacitive scanner, which does not provide as high a resolution, but which is extremely robust. The incremental scale can also be inductively scanned, e.g., using the eddy current method, and this also permits a robust design and, in particular, permits a design with a high protection rating (IP 69 K). All these scales and scanners are known to the prior art. The invention excludes only a magnetic design for the incremental parts.

The material measure also has permanent magnets, which are positioned at equidistance intervals in the measuring direction, i.e., in the direction of relative motion. The permanent magnets define the continuous succession of adjoining segments or sub-sections in the incremental scale. The magnetic field, created by the permanent magnets which succeed each other in the measuring direction, is recorded by at least one magnetic sensor belonging to the reading head. In a manner known to prior art, e.g., from DE 32 44 891 C2, this magnetic sensor ascertains the magnitude of the magnetic field at the momentary location of the reading heading. This magnitude is clearly assigned to a step within the segment of the incremental scale.

Finally the reading head is furnished with a Wiegand wire device (pulse-wire device). When passing over the permanent magnets this Wiegand wire device produces segment-counting pulses, which are counted upwards or downwards in an assigned counter, depending on the direction of movement. The counter reading thus indicates the segment of the material measure in which the reading head is currently located, proceeding from an original zero position. The counter permanently stores the current counter reading, so that—even if there is an interruption in operation—the current counter reading is preserved, and thus too the absolute position of the segment in which the reading head is momentarily located. To allow the storage circuit to be independent of external energy sources—which is important for permanent storage—the counter circuit and storage component may be fed by a battery. It is advantageous if the energy of the counting pulses of the Wiegand wire device is used to feed the counter circuit and the storage component, as is also described in DE 10 2006 017 865 A1. The measuring device is then also independent of the operating life of the battery. Counting the segment pulses in a counter which is independent of an external energy source is also advantageous in that relative motions that occur when the device is in a no-power state are also recorded, e.g., during manual operation, when the power source has been cut off or has failed.

The device according to the invention has these essential advantages:

The measured section of relative motion is practically unrestricted. For a linear device very long distances can thus be measured. In rotary systems the measurement may encompass many revolutions. The expense called for by the measuring device is largely independent of the length of the measured section, so that the device is highly cost-effective for long measured sections in particular.

The resolution of the measuring device is determined by the incremental scale and its interpolation, so that it is possible to achieve the high resolution of known devices regardless of the length of the measuring section.

The momentary position can be determined absolutely by counting the segments and permanently storing the counter reading; at the same time, the position of the reading head within a segment is assigned in absolute fashion by the magnetic sensors to a step within the incremental scale.

During the position measurement the counting device counts the permanent magnets traversed by the reading head in the forwards or backward directions by means of the segment-counting pulses produced by the Wiegand wire device, and permanently stores the counter reading. Proceeding from a zero point initially provided, this counter reading thus specifies in absolute fashion the segment within which the reading head is located at any time, i.e., particularly after an interruption in operation or after a process executed in this no-power interval. The length of the measuring section, i.e., the number of segments, is practically unrestricted. Within the given segment, the scanning of the magnetic field created by the permanent magnets, as performed by the magnetic sensors belonging to the reading head, provides an absolute position reading of the step in the given segment of the incremental scale within which the reading head is located. This position information is also available when the device is turned on. Within the scale step the position is again measured by interpolation of the scanning signals with a higher resolution.

The device according to the invention thus combines the advantages provided by the high resolution of an incremental scale, achieved with relatively simple means, and those provided by an absolute determination of position that does not subject the measuring area to restrictions imposed by cost or design.

The invention is next described in greater detail on the basis of an exemplary embodiment, which is depicted in the drawing. Shown are:

FIG. 1 a schematic view of the device

Figure 2:
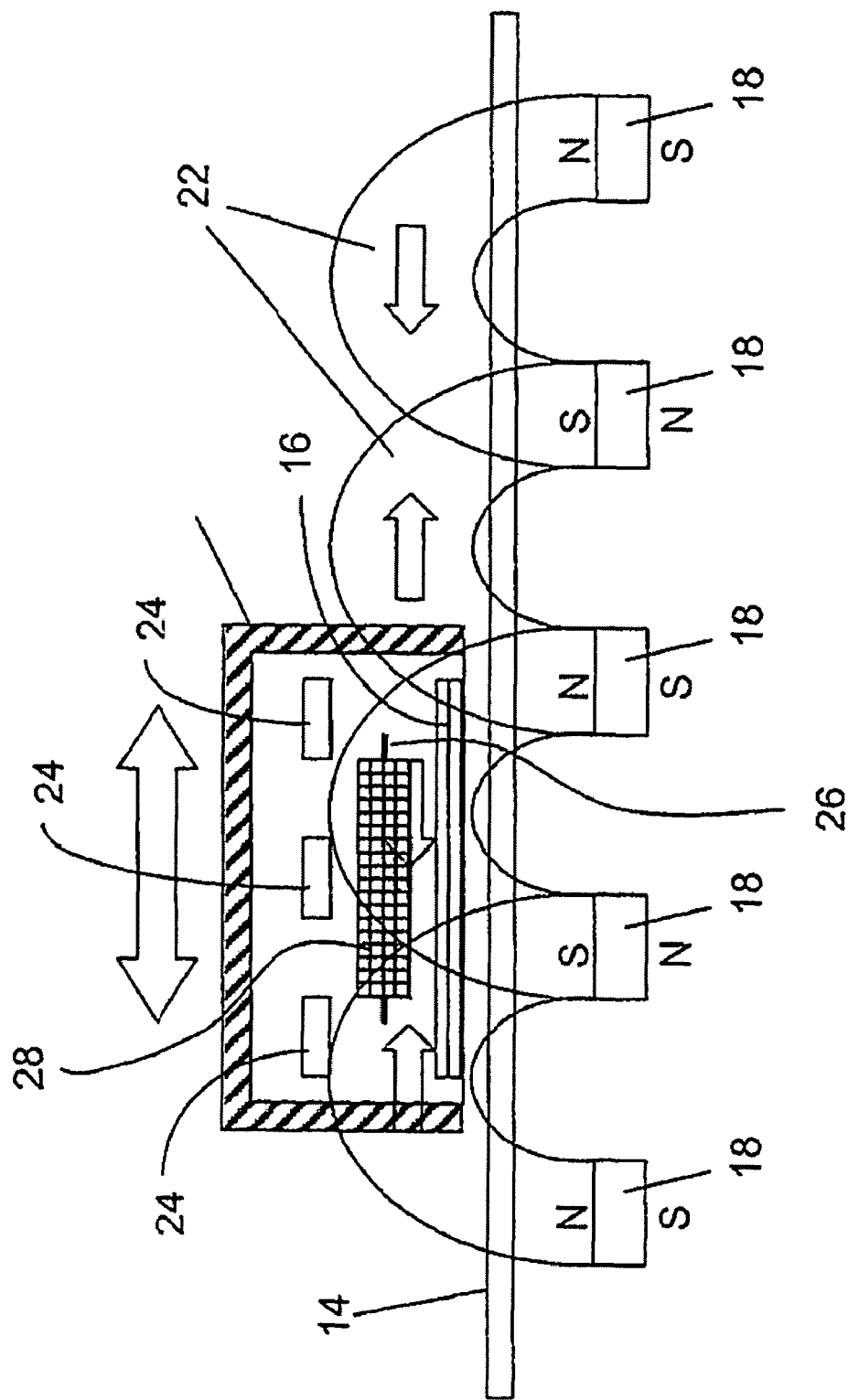

FIG. 2 a schematic top view of the device.

The drawing shows the invention embodied as a linear measuring device. An analogous design for a rotational measuring system will suggest itself to the specialist as a matter of course.

The device consists of a material measure 10 and a reading head 12. In the drawing, the material measure 10 and the reading 12 are each schematically depicted by a housing. The drawing depicts the material measure 10 as a segment of limited linear extension. As explained above, the material measure 10 may have a length that is practically unlimited. The material measure is firmly connected to an object, while the reading head 12 is firmly connected to a second object. The two objects can be moved relative to each other, specifically in the longitudinal direction of the material measure 10, as suggested in FIG. 2 by the double arrow.

The material measure 10 has an incremental scale 14, which runs over its entire length in the measuring direction, i.e., in the direction of motion. The incremental scale 14 is scanned by the scanner 16 of the reading head 12. The incremental scale 14 and the scanner 16 may have an optical, inductive, or capacitive design known to the prior art. Only a magnetic design for the incremental scale 14 is excluded as an alternative. During its motion across the incremental scale 14 the scanner 16 produces scanning signals in a known manner, and these signals have a basically sinusoidal curve. The sinusoidal form of the scanning signals make it possible to interpolate the intervals of the incremental scale 14 in a known manner, so that the resolution can again be improved by more than a factor of 1000 (up to 14 bits) compared to the resolution of the scale 14.

The material measure 10 also has permanent magnets 18, which are positioned at equidistant intervals in the direction of measurement, i.e., in the longitudinal direction of the material measure. The permanent magnets 18 are so positioned that they face the reading head 12 with their north or south pole in alternating fashion. In the drawing the permanent magnets 18 are positioned on the side of the material measure 10 that faces away from the reading head 12. Other arrangements are also possible. The permanent magnets 18 divide the incremental scale 14 into segments 20, i.e., subsections. Each segment 20 runs in the direction of measurement from one permanent magnet 18 to the next permanent magnet 18. The segments 20 adjoin each other in continuous fashion and comprise a plurality of steps in the incremental scale 14. The permanent magnets 18 produce a magnetic field 22, whose magnetic flux lines each run from one permanent magnet 18 to the next. This is indicated by arrows in FIG. 2.

At least one magnetic sensor 24 is positioned in the reading head 12, and in the depicted exemplary embodiment there are three magnetic sensors 24 positioned at intervals along the direction of measurement. The magnetic field 22 of the permanent magnets 18 penetrates the non-magnetic incremental scale 14 and the reading head 12. The magnetic sensors 24 record the magnetic field intensity of these magnetic fields. Since the magnetic fields change over the length of the segment, the magnetic sensors make it possible to determine the position of the reading head 12 within the length of the given segment 20. The magnetic sensors 24 may be, e.g., magneto-resistive sensors, as described, e.g., in DE 32 44 891 C2. The length of the segments 20, the number of steps in the incremental scale 13 within the segments 20, and the magnetic sensor 24 all have dimensions such that the measurement of the magnetic field intensity with the magnetic sensors 24 makes it possible to clearly assign the momentary position of the reading head 12 to a specific step on the incremental scale 14. To ensure that the position of the reading head 12 is clearly assigned to a specific segment 20, the distance between the permanent magnets 18 corresponds, at a minimum, to the length of the reading head 12.

Finally, there is positioned in the reading head 12 a Wiegand wire device consisting of a Wiegand wire 26 (pulse wire) which is aligned in the direction of relative motion and is wrapped in a coil 28. When the reading head 12 moves over one of the permanent magnets during the course of the relative motion of the reading head 12 and the material measure 10 an electrical pulse is triggered in the Wiegand wire 26, and the polarity of this pulse depends on the direction of motion of the reading head 12 relative to the material measure 10. These voltage pulses are fed as segment-counting pulses to an electrical counting circuit (not depicted), which counts the segment-counting pulses upwards or downwards, depending on the direction of motion. The given counter reading is permanently stored in a storage component belonging to the electronic evaluating device. To feed the counter circuit and provide permanent storage, the velocity-independent energy of the pulses of the Wiegand wire 26 is stored, so that the reading head 12 and the electronic evaluating unit are energy-self-sufficient and independent of external energy sources.

The zero position of the reading head 12 relative to the material measure 10 is fed into the measuring device on a one-time basis. When the reading head 12 moves relative to the material measure 10, the segments traversed by the reading head are counted upwards and downwards by the Wiegand wire device 26, 28, depending on the direction of motion. The momentary counter reading is permanently stored. The stored counter reading thus specifies absolutely (even upon resumption of operation after an interruption and after any movement by the measuring device during this interruption) the segment 20 at which the reading head 12 is positioned. Measurement of the magnetic field 22 by the magnetic sensors 24 also specifies in absolute terms the step in the incremental scale 14, inside the displayed segment 20, at which the reading head 12 is located. Inside of this step the scanner 16 can now interpolate the exact position with a high resolution.

LIST OF REFERENCE NUMERALS 10 material measure
12 reading head
14 incremental scale
16 scanner
18 permanent magnets
20 segments
22 magnetic field
24 magnetic sensor
26 Wiegand wire
28 coil

The invention claimed is:

1. A device for measuring the relative position of a material measure and a reading head, in which the material measure has an incremental scale; in which the incremental scale is non-magnetically scanned at a high resolution by a scanner belonging to the reading head; in which the material measure has permanent magnets, which are positioned at equidistant intervals in the direction of measurement and which establish continuous and adjoining segments within the incremental scale; in which the magnetic field created by the permanent magnets following each other in succession is recorded by at least one magnetic sensor belonging to the reading head; in which the magnitude of the recorded magnetic field is used to assign the position of the reading head to a step of the incremental scale within the segment defined by these permanent magnets; and in which a Wiegand wire device belonging to the reading head produces segment-counting pulses upon traversing the permanent magnets and these pulses are counted and permanently stored in the storage component.

2. The device according to claim 1, in which the incremental scale is scanned in an optical, capacitive, or inductive manner.

3. The device according to claim 1, in which the magnetic sensors are magneto-resistive sensors.

4. The device according to claim 1, in which the storage component counts the segment-counting pulses upwards or downward depending on the direction of relative motion.

5. The device according to claim 1, in which the counting circuit and the storage component are independent of external energy sources.

6. The device according to claim 5, in which the counting circuit and the storage component are fed by a battery.

7. The device according to claim 5, in which the counting circuit and the storage component are fed by the energy of the segment-counting pulses.

8. The device according to claim 1, in which the permanent magnets succeed each other with an alternating polarity.

9. The device according to claim 1, in which the distance in the measuring direction between the permanent magnets is at least equal to the length in the measuring direction of the reading head.

* * * * *